(12) United States Patent
Baggs et al.

(10) Patent No.: US 7,301,933 B1
(45) Date of Patent: Nov. 27, 2007

(54) DELIVERY OF A SERVICE PROGRAM TO A DIGITAL SIGNAL PROCESSOR WITHIN A MULTISERVICE PROCESSING SYSTEM

(75) Inventors: John Baggs, San Bernardino, CA (US); Louis Couture, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 811 days.

(21) Appl. No.: 09/746,515

(22) Filed: Dec. 22, 2000

(51) Int. Cl.
*H04L 12/64* (2006.01)
*H04J 3/14* (2006.01)

(52) U.S. Cl. .................... 370/352; 370/395.1; 370/466

(58) Field of Classification Search ................ 370/389, 370/395.1, 395.5, 395.52, 464–466, 215, 370/352; 709/310–313; 379/88.07
See application file for complete search history.

(56) References Cited

U.S. PATENT DOCUMENTS

| | | | |
|---|---|---|---|
| 3,889,054 A | 6/1975 | Nagel et al. | |
| 4,042,958 A | 8/1977 | Saylor et al. | |
| 4,054,911 A | 10/1977 | Fletcher et al. | |
| RE31,863 E | 4/1985 | Saylor et al. | |
| 5,003,591 A | 3/1991 | Kauffman et al. | |
| 5,133,081 A | 7/1992 | Mayo | |
| 5,251,205 A * | 10/1993 | Callon et al. ................ | 370/392 |
| 5,265,239 A * | 11/1993 | Ardolino ..................... | 709/217 |
| 5,367,678 A * | 11/1994 | Lee et al. .................... | 718/104 |
| 5,436,955 A | 7/1995 | Kaewell, Jr. et al. | |
| 5,440,740 A | 8/1995 | Chen et al. | |
| 5,467,286 A | 11/1995 | Pyle et al. | |
| 5,479,407 A | 12/1995 | Ko et al. | |
| 5,497,373 A * | 3/1996 | Hulen et al. ................. | 370/259 |
| 5,625,845 A | 4/1997 | Allran et al. | |
| 5,682,484 A | 10/1997 | Lambrecht | |
| 5,748,468 A | 5/1998 | Notenboom et al. | |
| 5,787,149 A | 7/1998 | Yousefi et al. | |
| 5,841,991 A | 11/1998 | Russell | |
| 5,880,720 A | 3/1999 | Iwafune et al. | |
| 5,881,135 A * | 3/1999 | Watts et al. .............. | 379/88.02 |
| 5,898,604 A * | 4/1999 | Winterer ..................... | 708/625 |
| 5,898,858 A * | 4/1999 | Gillespie ........................ | 716/4 |
| 5,982,783 A | 11/1999 | Frey et al. | |
| 6,002,689 A | 12/1999 | Christie et al. | |

(Continued)

FOREIGN PATENT DOCUMENTS

EP      0 505 884 A2     9/1992

(Continued)

OTHER PUBLICATIONS

"Different Device Types", 2001, techBites INTERactive, p. 1-11.

(Continued)

*Primary Examiner*—Chi Pham
*Assistant Examiner*—Ahmed Elallam
(74) *Attorney, Agent, or Firm*—Blakely, Sokoloff, Taylor & Zafman LLP

(57) ABSTRACT

A method including determining whether a digital signal processor needs a service program stored in a juke box overlay memory, and delivering the service program to the digital signal processor from the juke box overlay memory over a host port interface bus is disclosed.

26 Claims, 3 Drawing Sheets

U.S. PATENT DOCUMENTS

| | | | |
|---|---|---|---|
| 6,026,086 A | 2/2000 | Lancelot et al. | |
| 6,040,829 A | 3/2000 | Croy | |
| 6,052,145 A | 4/2000 | Macrae et al. | |
| 6,108,343 A * | 8/2000 | Cruickshank et al. | 370/437 |
| 6,125,111 A * | 9/2000 | Snow et al. | 370/360 |
| 6,160,545 A | 12/2000 | Eyer et al. | |
| 6,161,008 A | 12/2000 | Lee | |
| 6,181,694 B1 * | 1/2001 | Pickett | 370/353 |
| 6,198,558 B1 * | 3/2001 | Graves et al. | 398/135 |
| 6,198,751 B1 * | 3/2001 | Dorsey et al. | 370/466 |
| 6,269,095 B1 | 7/2001 | Neubauer et al. | |
| 6,556,676 B1 * | 4/2003 | Buchanan et al. | 379/399.01 |
| 6,567,881 B1 * | 5/2003 | Mojaver et al. | 710/313 |
| 6,603,757 B1 * | 8/2003 | Locascio | 370/352 |
| 6,707,825 B1 * | 3/2004 | Turner et al. | 370/467 |
| 6,747,995 B1 * | 6/2004 | Brown et al. | 370/493 |
| 6,829,249 B1 * | 12/2004 | Ray et al. | 370/466 |
| 6,928,076 B2 * | 8/2005 | Mehta et al. | 370/392 |
| 6,985,477 B2 * | 1/2006 | Couture | 370/352 |
| 7,200,386 B2 * | 4/2007 | Mauro, II | 455/418 |
| 2001/0024439 A1 * | 9/2001 | Morgan et al. | 370/352 |
| 2002/0031086 A1 * | 3/2002 | Welin | 370/229 |
| 2002/0059393 A1 * | 5/2002 | Reimer et al. | 709/212 |
| 2002/0080782 A1 * | 6/2002 | Dick et al. | 370/362 |
| 2002/0110111 A1 | 8/2002 | Couture | |
| 2003/0128715 A1 * | 7/2003 | Deo et al. | 370/442 |

FOREIGN PATENT DOCUMENTS

| | | |
|---|---|---|
| GB | 2 200 816 A | 8/1988 |
| WO | WO 94/16528 | 7/1994 |

OTHER PUBLICATIONS

IBM Technical Disclosure Bulletin, vol. 34, No. 7B Dec. 1991 (pp. 237-239).

* cited by examiner

DELIVERY OF A SERVICE PROGRAM TO A DIGITAL SIGNAL PROCESSOR WITHIN A MULTISERVICE PROCESSING SYSTEM

CROSS REFERENCE TO RELATED APPLICATION

The invention is related to "A method and apparatus for supporting multiservice digital signal processing applications," invented by Louis Couture, filed Mar. 26, 1998, U.S. application Ser. No. 09/049,288.

FIELD OF THE INVENTION

The invention is related to the field of digital signal processing.

BACKGROUND OF THE INVENTION

In multiservice call processing applications (e.g., voice, fax, modem, and video communications), a matrix of processors are typically required to process a number of channels to provide multiple services on one hardware platform. Ideally, a service provider using such equipment would want to be able to service any type of incoming call with the same hardware box on a mixed, random, and dynamic basis. Different firmware images thus need to be loaded and executed by the processors to accommodate the various processing requirements associated with these different services.

A typical solution is to store all of the possible algorithms that may be needed in the memory of each processor. However, this solution is not economically practical, because of the large memory requirements for this solution.

SUMMARY AND OBJECTS OF THE INVENTION

A method including determining whether a digital signal processor needs a service program stored in a juke box overlay memory, and delivering the service program to the digital signal processor from the juke box overlay memory over a host port interface bus is disclosed.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method for delivery of a juke box overlay program via a processor host port from a juke box overlay memory that stores a library of programs to an internal program memory of a digital signal processor is disclosed. The overlay program can be used to replace or modify a program that is stored in the program memory of the digital signal processor. The programs in the library are used to provide different services to a multiple service system. In one embodiment, a packet pump manager tells a digital signal processor to process packets using a given service. The digital signal processor indicates that it does not have the program for the given service. A juke box overlay manager then causes the juke box overlay manager to download the program to the internal memory of the digital signal processor. The digital signal processor then executes the program and provides the required service to the packets that it processes. Thus, the apparatus can provide service programs from the library to one or more processors on a mixed, random, and dynamic basis.

Figure 1:
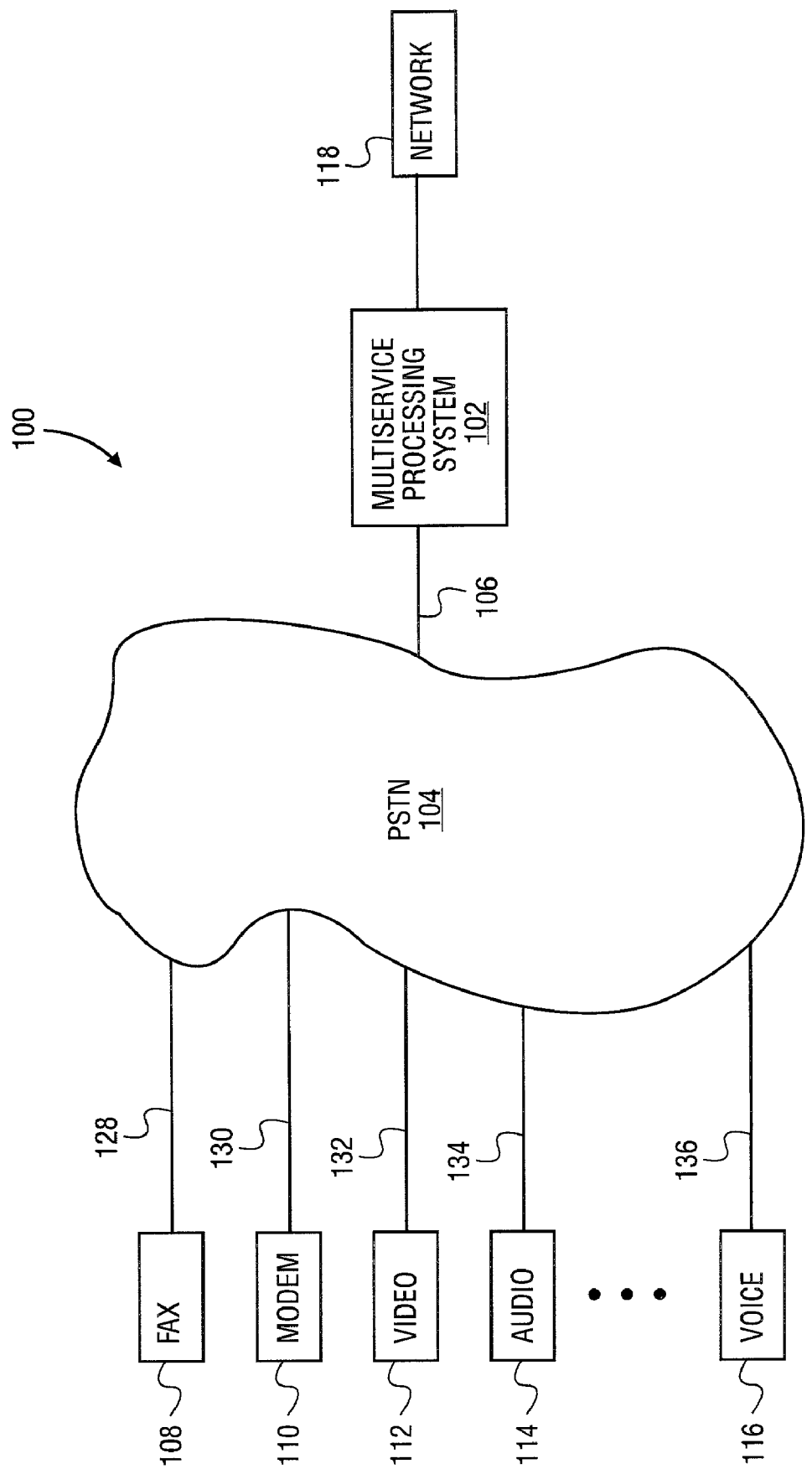
FIG. 1 is a communications system including a multiservice processing system of one embodiment.

FIG. 1 is a communications system 100 including a multiservice processing system 102 of one embodiment. The multiservice processing system 102 receives data from a public switched telephone network (PSTN) 104 over a multiplexed line 106. The data is received as pulse coded modulation (PCM) data streams, but the embodiment is not so limited. In one embodiment, the multiplexed line 106 comprises 24 multiplexed data lines, but the embodiment is not so limited. The multiplexed line 106 may be a T1 data line, a T3 data line, or an E1 data line, but the embodiment is not so limited. The data types 108-116 received over the PSTN 104 comprise, but are not limited to, facsimile data 108, modem data 110, video data 112, audio data 114, and voice data 116, for example telephone data. The lines 128-136 over which the data 108-116, respectively, is provided may be multiplexed data lines, but the embodiment is not so limited. The multiservice processing system 102 processes the received PCM data and generates packets or cells comprising the processed data. The packets or cells are provided to an IP network 118 for transmission.

The multiservice processing system 102 also receives packetized data from the internet protocol (IP) network 118. The data types received in packets or cells over the IP network 118 comprise, but are not limited to, facsimile data, modem data, video data, audio data, and voice data, for example telephone data. The multiservice processing system 100 unpacks the packetized data and generates PCM data streams comprising the data. The PCM data streams are provided to the PSTN 104 using the multiplexed line 106. The PSTN 104 distributes the PCM data streams to individual subscribers 108-116 of particular destinations using data lines 128-136. The data lines 128-136 may be multiplexed data lines, but the embodiment is not so limited.

Figure 2:
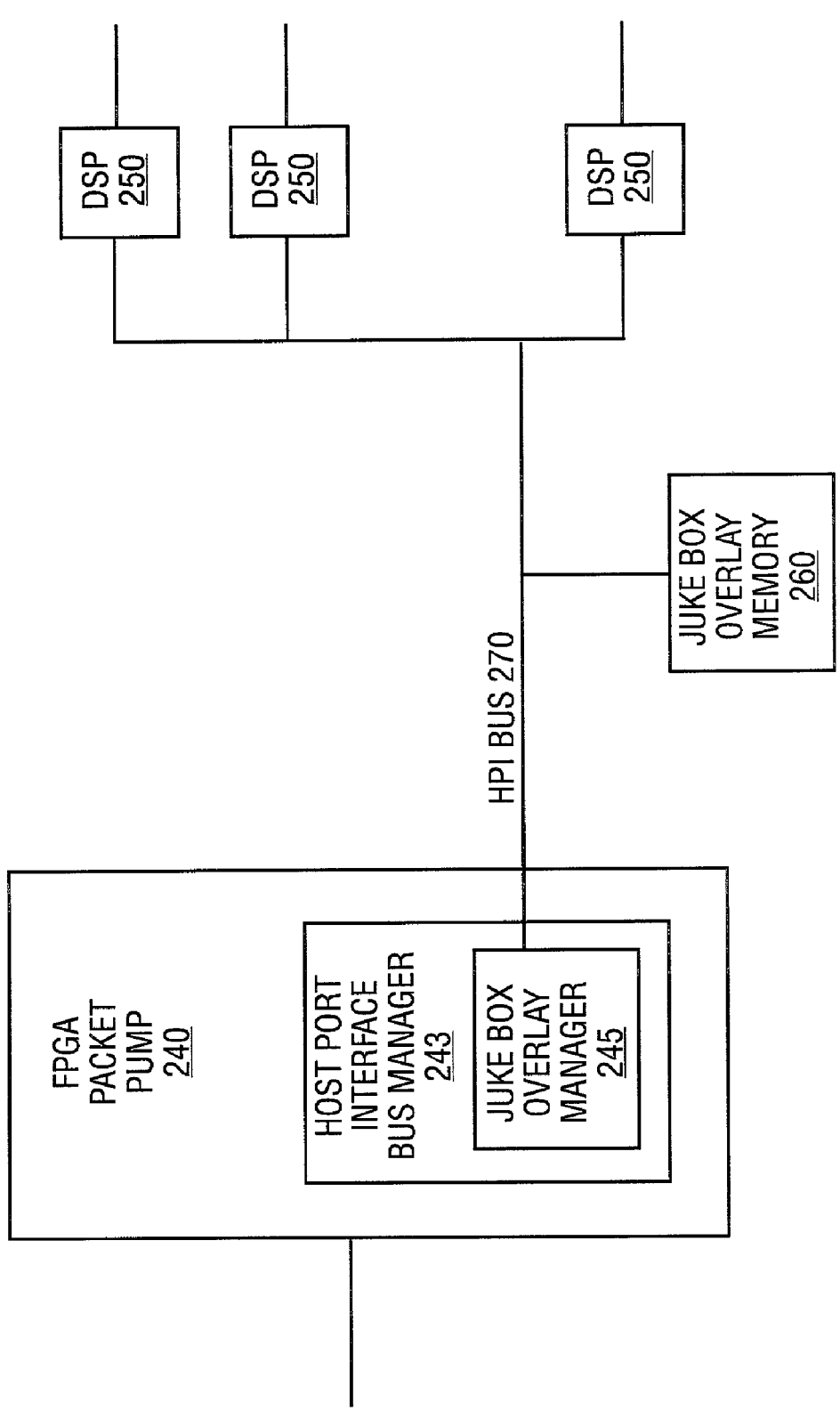
FIG. 2 shows an embodiment of a multiservice processing system.

FIG. 2 shows an embodiment of multiservice processing system 102. Field processor gate array (FPGA) packet pump 240 sends and receives the PCM data streams to and from the PSTN. Packet pump 240 sends the data streams to and from appropriate digital signal processors (DSP) 250 through HPI bus 270 using a packet pump host port interface (HPI) bus manager 245, which may be implemented as a state machine for example. Each DSP 250 converts PCM data streams received from the packet pump into IP packets, and places the packets onto the IP network using a firmware or software program stored in the DSP internal memory. Each DSP 250 also converts packets received from the IP network into PCM data steams using the stored program, and sends the data streams to packet pump 240. The program may be placed in the DSP internal memory by juke box overlay memory 260. Juke box overlay memory 260 stores a library of software programs, and can download the library of software algorithms to the DSPs 250 through the HPI bus. The juke box overlay memory may be a static random access memory (SRAM), for example. The memory 260 is a "juke box" overlay memory because the memory 260 stores several service programs, thus functioning as a "juke box."

The program stored in each DSP internal memory is used to provide a service to the data packet or data stream that is processed by the DSP. For example, a fax program can be used to convert a fax data stream into a fax IP packet. The packet pump tells the DSP which service to provide to a given data stream or data packet. If the DSP has the corresponding service program stored in its internal memory, the DSP processes the data stream or data packet by executing the stored program. If the corresponding service program is not stored in the internal memory of the DSP, then the DSP indicates that it does not have the service program. A juke box overlay manager 245, which may be part of HPI bus manager 243 in the packet pump, then causes the juke box overlay memory to download the needed service program to the internal memory of the DSP. The DSP then processes the packet or data stream using the downloaded service program.

Figure 3:
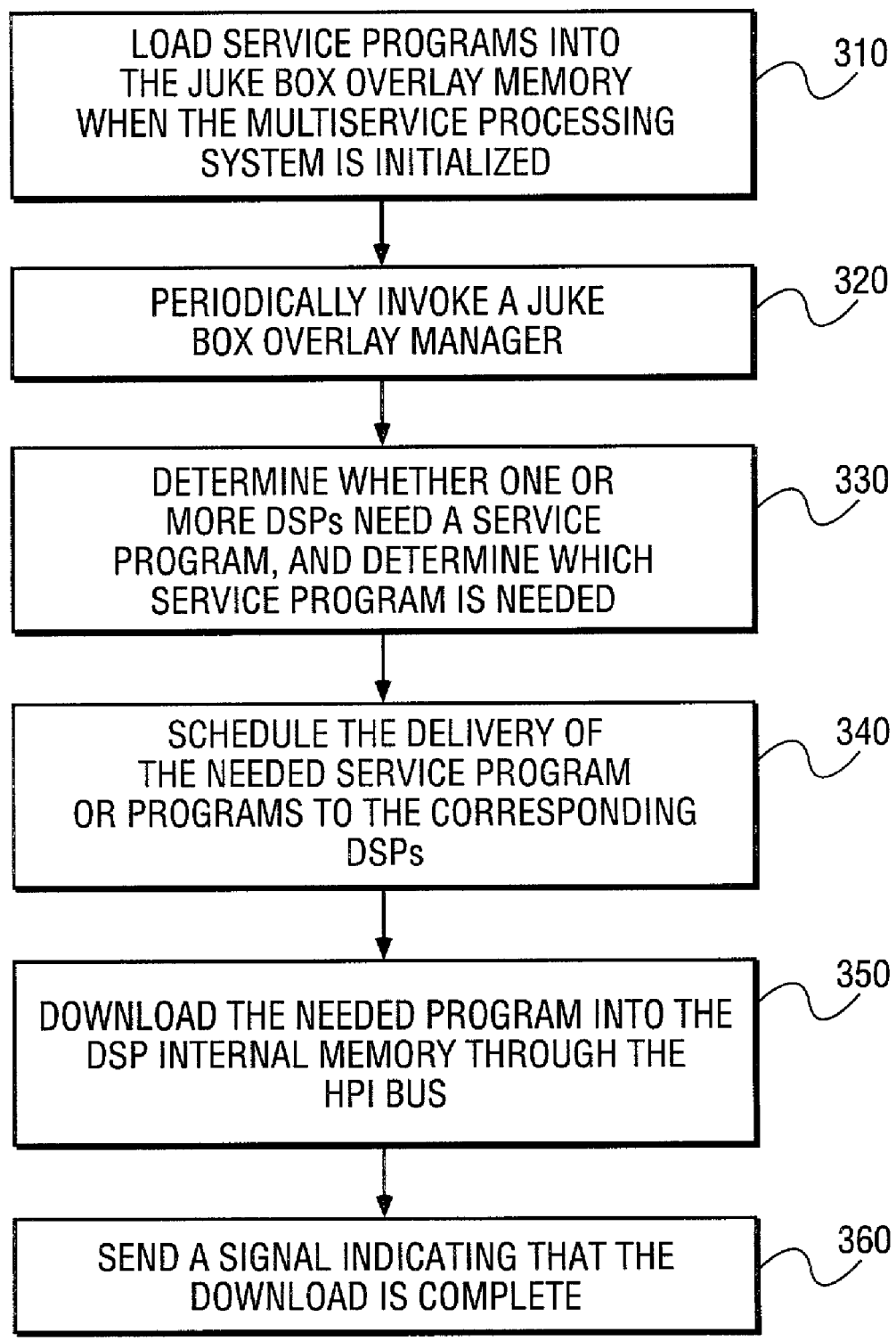
FIG. 3 shows one embodiment of a method for delivering a service program to a digital signal processor within a multiservice processing system.

FIG. 3 shows one embodiment of a method for delivering a service program from the juke box overlay memory to the DSP internal memory using a HPI bus within a multiprocessing system. The service programs for the multiservice processing system are loaded into the juke box overlay memory when the multiservice processing system is initialized, 310. A juke box overlay manager in the packet pump is periodically invoked, 320. The juke box overlay manager may be invoked by the HPI bus manager in the packet pump.

The juke box overlay manager determines whether one or more DSPs need a service program. The juke box overlay manager also determines which service program or programs are needed, 330. For example, each DSP may indicate that it needs a given service program by setting a flag in the internal memory of the DSP. The juke box overlay manager then can read the flag to determine that the DSP needs a program, and to determine which program is needed by the DSP.

The juke box overlay manager then schedules the delivery of the needed service program or programs to the corresponding DSPs, 340. For example, the juke box overlay manager may prioritize the delivery of several needed programs by determining the number of DSPs that need each requested program. The program that is needed by the most DSPs may then be delivered first. Scheduling the delivery of a program may also include determining the size of the needed program, determining where the needed program is located in the juke box overlay memory, and determining the memory addresses of each DSP internal memory that will receive the program. For example, the programs that are stored in the library can be indexed by size, delivery location, and storage offset, to allow a state machine to deliver a given program without requiring an additional processor.

The juke box overlay manager then causes the juke box overlay memory to download the needed program directly into the internal memory of one or more DSPs through the HPI bus, 350. If several DSPs need the service program, the service program may be simultaneously downloaded in parallel to all DSPs that need the program. If a subsequent DSP requests the program while the program is being downloaded, the DSP can start receiving the download. The program code that was not initially delivered to the subsequent DSP can be downloaded at a later time. Also, other DSPs can place a request for other programs in a request queue while a given program is being downloaded.

After the program is downloaded, the juke box overlay manager sends a signal indicating that the download is complete, 360. The DSPs that received the downloaded service program in their internal memory then process data packets and data streams by executing the downloaded program. The juke box overlay manager may then schedule another program to be downloaded, or may return control of the HPI bus to the HPI bus manager if a given amount of time has expired. The HPI bus manager then resumes sending and receiving packets from and to the FPGA, and then subsequently invokes the juke box overlay manager, as discussed above.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    determining whether a first digital signal processor needs one of a plurality of service programs stored in an overlay memory, wherein the plurality of service programs comprises service programs associated with voice communication, fax communication, modem communication, video communication, and audio communication; and
    scheduling delivery of the needed service program to the first digital signal processor from the overlay memory over a host port interface bus based on one or more factors including size of the needed program, location of the needed program in the overlay memory, and whether a second digital signal processor also needs the needed program.

2. The method of claim 1, further comprising generating a data packet from a pulse code modulated data stream using the service program.

3. The method of claim 2, further comprising receiving the pulse code modulation data stream from a public switched telephone network.

4. The method of claim 2, further comprising:
    transmitting the data packet over an internet protocol network.

5. The method of claim 2, wherein the data packet includes data comprising at least one of voice communication, fax communication, modem communication, video communication, and audio communication.

6. The method of claim 1, further comprising:
    receiving a packet from an internet protocol network;
    generating a pulse code modulation data stream from the packet using the service program; and
    transmitting the pulse code modulation data stream over a public switched telephone network.

7. The method of claim 1, wherein the needed service program comprises an algorithm and wherein scheduling delivery comprises downloading the algorithm to the digital signal processor.

8. An apparatus comprising:
    means for determining whether a first digital signal processor needs one of a plurality of service programs stored in an overlay memory, wherein the plurality of service programs comprises service programs associated with voice communication, fax communication, modem communication, video communication, and audio communication; and
    means for scheduling delivery of the service program to the first digital signal processor from the overlay memory over a host port interface bus based on one or more factors including size of the needed program, location of the needed program in the overlay memory, and whether a second digital signal processor also needs the needed program.

9. The apparatus of claim 8, further comprising means for generating a data packet from a pulse code modulated data stream using the service program.

10. The apparatus of claim 9, further comprising means for receiving the pulse code modulation data stream from a public switched telephone network.

11. The apparatus of claim 9, further comprising:
means for transmitting the data packet over an internet protocol network.

12. The apparatus of claim 9, wherein the data packet includes data comprising at least one of voice communication, fax communication, modem communication, video communication, and audio communication.

13. The apparatus of claim 8, further comprising:
means for receiving a packet from an internet protocol network;
means for generating a pulse code modulation data stream from the packet using the service program; and
means for transmitting the pulse code modulation data stream over a public switched telephone network.

14. A computer readable medium to store instructions which, when executed by a processing system, cause the system to:
determine whether a first digital signal processor needs one of a plurality of service programs stored in an overlay memory, wherein the plurality of service programs comprises service programs associated with voice communication, fax communication, modem communication, video communication, and audio communication; and
schedule delivery of the service program to the first digital signal processor from the overlay memory over a host port interface bus based on one or more factors including size of the needed program, location of the needed program in the overlay memory, and whether a second digital signal processor also needs the needed program.

15. The medium of claim 14, wherein the executed instructions further cause the system to generate a data packet from a pulse code modulated data stream using the service program.

16. The medium of claim 15, wherein the executed instructions further cause the system to:
receive the pulse code modulation data stream from a public switched telephone network.

17. The medium of claim 15, wherein the executed instructions further cause the system to:
transmit the data packet over an internet protocol network.

18. The medium of claim 14, wherein the service program provides a service selected from the group comprising voice communication, fax communication, modem communication, video communication, and audio communication.

19. The medium of claim 14, wherein the executed instructions further cause the system to:
receive a packet from an internet protocol network;
generate a pulse code modulation data stream from the packet using the service program; and
transmit the pulse code modulation data stream over a public switched telephone network.

20. An apparatus comprising:
an interface manager to determine a first digital signal processor needs one of a plurality of service programs stored in an overlay memory, wherein a plurality of service programs comprises service programs associated with voice communication, fax communication, modem communication, video communication, and audio communication;
a overlay manager to schedule delivery of the service program to the first digital signal processor from the overlay memory over a host port interface bus based on one or more factors including size of the needed program, location of the needed program in the overlay memory, and whether a second digital signal processor also needs the needed program; and
a host port interface bus to deliver the service program to the digital signal processor from the overlay memory.

21. The apparatus of claim 20, further comprising the overlay memory, the overlay memory to store a plurality of algorithms.

22. The apparatus of claim 21, further comprising the digital signal processor.

23. The apparatus of claim 22, further comprising a plurality of the digital signal processors coupled to the host port interface bus.

24. The apparatus of claim 23, further comprising a packet pump comprising:
the interface manager; and
a host port interface bus manager coupled to the host port interface bus.

25. The apparatus of claim 24, further comprising a public switched telephone network coupled to transmit a pulse code modulation data stream to the packet pump.

26. The apparatus of claim 24, wherein the overlay memory is a static random access memory.

* * * * *